US007693897B2

(12) United States Patent
Bugir et al.

(10) Patent No.: US 7,693,897 B2
(45) Date of Patent: Apr. 6, 2010

(54) SYSTEM, PROGRAM PRODUCT, AND METHODS TO ENHANCE MEDIA CONTENT MANAGEMENT

(75) Inventors: Taras Markian Bugir, Golden, CO (US); Andrew McCulloch, Castle Rock, CO (US)

(73) Assignee: Harris Corporation, Melbourne, FL (US)

( * ) Notice: Subject to any disclaimer, the term of this patent is extended or adjusted under 35 U.S.C. 154(b) by 1084 days.

(21) Appl. No.: 11/305,872

(22) Filed: Dec. 16, 2005

(65) Prior Publication Data

US 2007/0050336 A1 Mar. 1, 2007

Related U.S. Application Data

(60) Provisional application No. 60/712,052, filed on Aug. 29, 2005, provisional application No. 60/711,699, filed on Aug. 26, 2005, provisional application No. 60/711,700, filed on Aug. 26, 2005, provisional application No. 60/715,664, filed on Sep. 8, 2005, provisional application No. 60/712,051, filed on Aug. 29, 2005.

(51) Int. Cl.
*G06F 17/00* (2006.01)
*G06F 17/30* (2006.01)

(52) U.S. Cl. .................. 707/707; 707/792; 707/805

(58) Field of Classification Search ............ 707/3
See application file for complete search history.

(56) References Cited

U.S. PATENT DOCUMENTS 5,649,192 A 7/1997 Stucky

| 5,862,325 | A * | 1/1999 | Reed et al. ............ 709/201 |
|---|---|---|---|
| 6,356,905 | B1 * | 3/2002 | Gershman et al. ........ 707/10 |
| 6,601,233 | B1 * | 7/2003 | Underwood ............ 717/102 |
| 6,957,186 | B1 * | 10/2005 | Guheen et al. ............ 705/1 |
| 6,971,108 | B1 * | 11/2005 | Clark et al. ............ 719/316 |
| 7,072,934 | B2 * | 7/2006 | Helgeson et al. ........ 709/203 |
| 7,124,101 | B1 * | 10/2006 | Mikurak ............... 705/35 |
| 7,130,807 | B1 * | 10/2006 | Mikurak ................ 705/7 |
| 2002/0019827 | A1 | 2/2002 | Shiman et al. |
| 2002/0077988 | A1 | 6/2002 | Sasaki et al. |

(Continued)

OTHER PUBLICATIONS

Brian Eberman, Blair Fidler, Robert A. Iannucci, Christ Joerg, Leonidas Kontothanassi, David E. Kovalcin, Pedro Moreno, Michael J. Swain, Jean-Manuel Van thong, "Indexing Multimedia for the Internet", Cambridge Research Laboratory Technical Report Series, Mar. 1999.*

*Primary Examiner*—Don Wong
*Assistant Examiner*—Binh V Ho
(74) *Attorney, Agent, or Firm*—Duane Morris, LLP

(57) ABSTRACT

Embodiments of systems, program products, and methods to enhance and more effectively manage media content are provided. An embodiment of a system, for example, can include a first preselected network framework defining a first network stage and a second preselected network framework responsive to the first network stage and defining a second network stage. The system can also include a code generator responsive to the second network stage to generate program code, a framework stage responsive to the code generator to establish a content management framework and defining a content search engine, a media content services core responsive to the content search engine to enhance digital file management and allow a plurality of media content management services to be performed, and a set of media content service modules each responsive to the media content services core to perform content management services to media.

10 Claims, 5 Drawing Sheets

U.S. PATENT DOCUMENTS

2003/0103645 A1 6/2003 Levy et al.
2004/0064579 A1 4/2004 Jennings et al.
2004/0205028 A1 10/2004 Verosub et al.
2005/0091283 A1 4/2005 Debique et al.
2005/0108402 A1 5/2005 Colson et al.

* cited by examiner

SYSTEM, PROGRAM PRODUCT, AND METHODS TO ENHANCE MEDIA CONTENT MANAGEMENT

RELATED APPLICATIONS

Related Applications

This invention claims the benefit of and priority to U.S. Provisional Patent Application No. 60/712,052, by Bugir et al., titled "System, Program Product, and Methods to Enhance Media Content Management," filed on Aug. 29, 2005; and is related to U.S. Provisional Patent Application No. 60/711,699, by Bugir et al., titled "System, Program Product, and Methods to Enhance Media Content Management," filed on Aug. 26, 2005; U.S. Non-Provisional patent application Ser. No. 11/305,870, by Bugir et al., titled "System, Program Product, and Methods to Enhance Media Content Management," filed on Dec. 16, 2005; U.S. Provisional Patent Application No. 60/711,700, by Bugir et al., titled "System, Methods, and Program Product to Trace Content Genealogy," filed on Aug. 26, 2005; U.S. Non-Provisional patent application Ser. No. 11/305,873, by Bugir et al., titled "System, Methods, and Program Product to Trace Content Genealogy," filed on Dec. 16, 2005; U.S. Provisional Patent Application No. 60/715,664, by Bugir et al., titled "System, Program Product, and Methods to Enhance Media Content Management," filed on Sep. 8, 2005; U.S. Non-Provisional patent application Ser. No. 11/305,852, by Bugir et al., titled "System, Program Product, and Methods to Enhance Media Content Management," filed on Dec. 16, 2005; U.S. Provisional Patent Application No. 60/712,051, by Bugir et al., titled "System, Methods, and Program Product to Trace Content Genealogy," filed on Aug. 29, 2005; and U.S. Non-Provisional patent application Ser. No. 11/305,871, by Bugir et al., titled "System, Methods, and Program Product to Trace Content Genealogy," filed on Dec. 16, 2005, all incorporated by reference herein in their entirety.

BACKGROUND OF THE INVENTION

1. Field of the Invention

This invention relates to content management and the media industry and, more particularly, enhanced systems, program product, and methods to manage media content.

2. Description of Related Art

The media industry is experiencing a profound business disruption due to the change from analog to digital business practices. This, for example, has led to a radical re-evaluation of current media management business processes, particularly in relation to the proliferation of channels, consumer devices, delivery mechanisms and rights management. Technology has moved from that of a serial scheduling of content on a single-medium, single channel, to one of multi-channel multi-media, and multi-platform. Also, content schedules, for example, are now not only the domain of the deliverer of content, but through consumer technology advances in such content schedules can be controlled by consumers.

Recently, digital content store systems and metadata store systems have been developed which allow some level of control over media content, e.g., song, documents, video. Some of these systems also associate metadata with labels unrelated to content and location of the content. Such systems, however, often provide control over content in media by key codes or authorization codes to allow access to only paid users or have a preselected time frame for expiration of rights or have expiration rights upon preselected number of uses.

Applicants have recognized that since the advent of digitization, the focus has been on storing and managing the newly digitized asset. Accordingly, little attention has been paid to the value of the content, especially fiscal, as businesses move to digital environments.

Additionally, Applicants recognized that developers often, as a matter of course, build a framework for the particular application they are developing, be this just coding standards, sample code, or common base classes to support their needs. What also often happens during such development is that these "frameworks" become tied to the product being developed and invariably cannot be re-used by new developments without significant rework to remove dependencies related to the product to which the framework is tied. This, however, may not be bad coding, but just that developers are often focused on the problems they need to solve related to the specific application and this can lead to ties being placed into the core code base.

SUMMARY OF THE INVENTION

In view of the foregoing, embodiments of the present invention advantageously provide enhanced systems, program products, and methods to more effectively manage media content. Embodiments of program product of the present invention, for example, advantageously provide generic support for a wide class of applications, and in essence, provides a content management operating system. Embodiments of systems, program-products, and methods of the present invention, for example, advantageously can provide a powerful platform as an open, next-generation, end-to-end solution. Embodiments of systems, program products and methods of the present invention advantageously can provide a platform that allows integration/interoperability, openness/partnerships, content-focused/media agnosticism and business focus. For example, broadcasters historically cobble together different vendors' offerings. Embodiments of systems, program products, and methods of the present invention, however, can focus on the use of an "H-Class" enterprise workflow methodology and standards among commercial applications to ensure interoperability and streamlines workflows. For example, these embodiments can enable vendors of substantially all types in the media industry to leverage the power of H-Class to benefit from a platform's content delivery capabilities and, in essence, serve as a type of standard operating system for media and entertainment markets and allow users to easily integrate third party or vendor applications.

Additionally, embodiments of the present invention facilitate different ways of handling what may be termed "business transactions." For example, not every organization will use content and data in the same manner. The business models can be quite different. Embodiments of the present invention provide program product or software that establishes a software framework that consists of core services into which software components snap-in, plug-in, interface, or otherwise build upon each other.

For example, embodiments of the present invention allow or enhance configurability of diverse business models to support organizations as the organizations grow or evolve. Embodiments of the present invention also support base functions of security and an agent infrastructure which provides, for example, auditing capabilities. A standard user interface framework can be provided to co-exist with the base framework and can allow all components to look and feel alike.

Further, embodiments of the present invention, for example, can be differentiated in that software is not built as applications per-se but rather as content-aware functions that snap into the base. Accordingly, embodiments of the present invention recognize that as the framework supports an application that considers all data to be content and vice-versa, there is a generalizing of business and media types. This, for example, can mean that managing a digital business is no longer limited to media focused organizations but is extensible into other industry verticals as well.

An embodiment of a system, for example, can include a first preselected network framework defining a first network state and a second preselected network framework responsive to the first network state and defining a second network stage. The system can also include a code generator responsive to the second network stage to generate program code, a framework stage responsive to the code generator to establish a content management framework and defining a content search engine, a media content services core responsive to the content search engine to enhance digital file management and allow a plurality of media content management services to be performed, and a set of media content service modules each responsive to the media content services core to perform content management services to media. The set, for example, can be selected from the plurality of media content management services.

Embodiments of the present invention also include related methods. For example, an embodiment of a method can include interfacing a preselected network framework with an established network framework so that the preselected network framework defines a network stage, generating program code responsive to the network stage, establishing a content management framework responsive to the program code so that the content management framework defines a content search engine, and providing a media content services core responsive to the content search engine to enhance digital file management and allow a plurality of media content management services to be performed.

According to another embodiment of the present invention, an embodiment of a method can include providing an industry generic framework to thereby provide a content management program product adapted to define metadata related to media content and to manage content relationships, providing a code generator adapted to generate program code for the industry generic framework, and providing a plurality of media industry specific core reusable modules adapted to provide a plurality of media industry specific functions.

Advantageously, embodiments of the present invention enhance the business ability to take these digital assets and embed rights and associated commercial transactions to ensure the correct usage and ability to repurpose that content. Embodiments of the present invention not only enhance cataloging content but also apply business rules to that content and facilitate organizations to account and schedule its usage.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
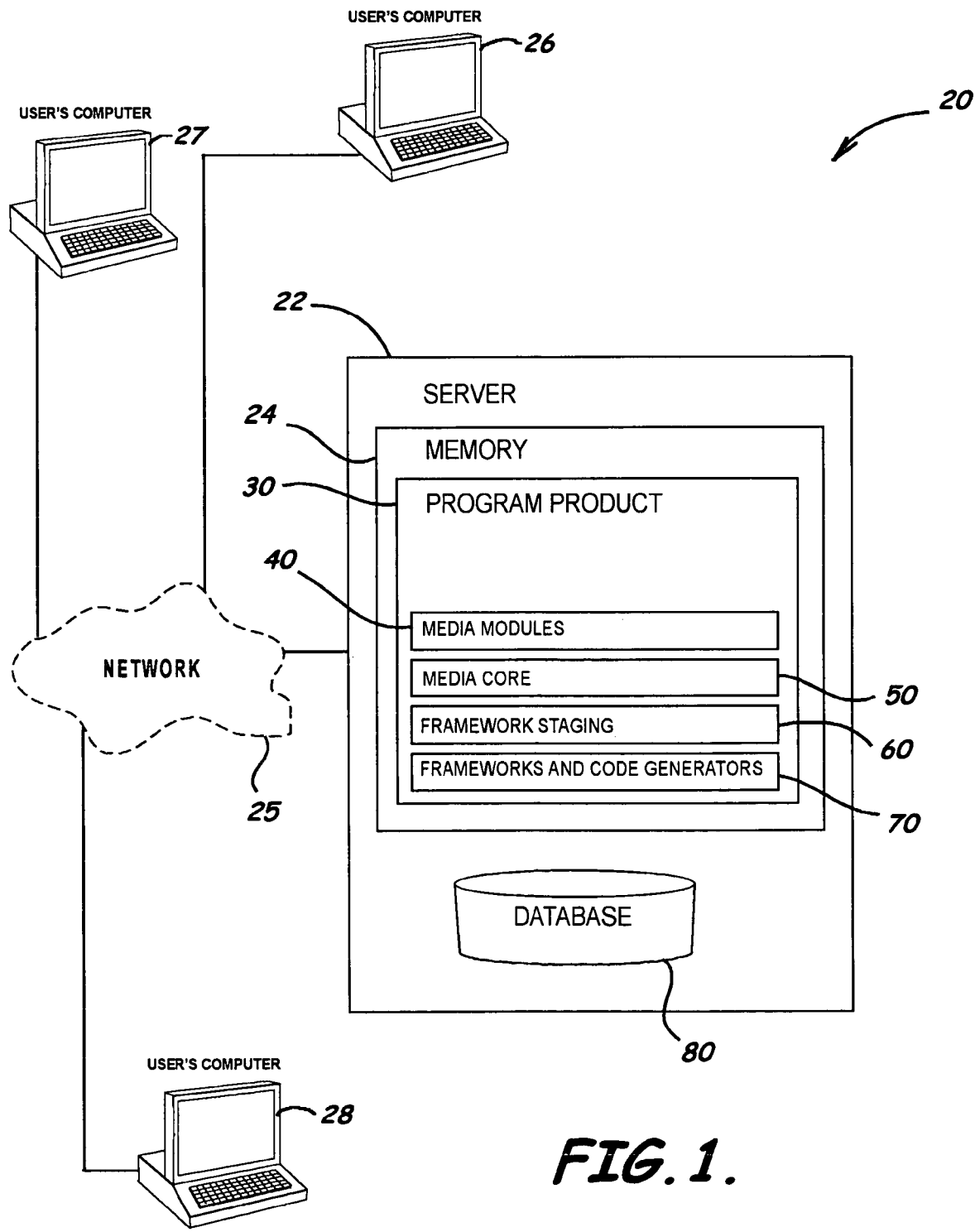
FIG. 1 is a schematic diagram of a system according to an embodiment of the present invention.

The present invention now will be described more fully hereinafter with reference to the accompanying drawings in which embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

As illustrated in FIGS. 1-5, embodiments of systems 20, program products 30, and methods 90 of the present invention, for example, can be used to substantially address any enterprise application and standards and framework already in existence within a Microsoft .Net Framework, for example, to support these needs or requirements and, where needed or desired, to supplement these to hide the complexities, as understood by those skilled in the art, and allow scope for changes with substantially reduced or minimal impact on the business functionality developed on substantially all projects using the .Net Framework.

Embodiments of the system 20 can include a communication network 25 for transmitting media files or data, a content management server 22 having a processor and memory 24 coupled to the processor, a database 80 accessible to the processor of the content management server 22 and including media files associated with metadata records, content management program product 30 stored in the memory 24 of the content management server 22 to manage media content, and a plurality of user computers 26, 27, 28, including developers, media clients, and others, to provide such users with online access over the communication network 25. Note, the memory 24 can include volatile and nonvolatile memory known to those skilled in the art including, for example, RAM, ROM, and magnetic or optical disks, just to name a few. Further, the program product 30 can be in the form of microcode, programs, routines, and symbolic languages that provide a specific set or sets of ordered operations that control the functioning of the hardware and direct its operation, as known and understood by those skilled in the art.

It should be understood that the preferred server configuration is given by way of example and that other types of servers or computers configured according to various other methodologies known to those skilled in the art can be used. The server 22 shown schematically in, for example, FIG. 1 represents a server or server cluster or server farm and is not limited to any individual physical server. The server site may be deployed as a server farm or server cluster managed by a serving hosting provider. The number of servers and their architecture and configuration may be increased based on usage, demand and capacity requirements for the system 20.

As will be understood by those skilled in the art, an Enterprise Framework abstracts the technology underpinnings from the business of writing applications, freeing application developers to focus on providing business solutions, not building technology to support the applications. Embodiments of systems 20, program products 30 and methods 90 of the present invention recognize that a goal of an Enterprise Framework can be to "hide" the complexities of the .Net Framework, providing a simplified set of commonly required functionality in a manner that promotes consistence within a single product and re-use across multiple products and development teams.

For example, to operate effectively in multiple countries, embodiments of systems 20, program products 30, and methods 90, according to the present invention, can support presentation of and entry of data, e.g., media content and, particularly high-bandwidth content such as that stored in databases, in multiple languages. This support is not just multi-currency, but user interface (UI) screens, web pages, reports and other interactions with the user. Although the .Net framework is Unicode compliant, program product or software built upon the .Net framework is not necessarily compliant. Embodiments of systems 20, program products 30, and methods 90 of the present invention can be compliant to ensure standardization.

Embodiments of systems 20, program products 30, and methods 90 of the present invention can be adapted to recognize that substantially all products will, over time, take upgrades from Microsoft and any other third party vendor and that upgrades have and will lead to the current code base "breaking" to some degree. Accordingly, to limit or substantially reduce this impact, use of good object-oriented (OO) programming principles can help to some degree, but to further this, such embodiments, e.g., an H-Class Framework, abstracts out as much of the underlying classes as reasonably possible to provide a layer or framework layer in which changes can be made to ensure integrity of code being developed using the framework.

Further, according to some embodiments, such systems 20, program products 30, and methods 90 can take advantage of the fact that the .Net Framework provides many mechanisms for configuring and deploying an application from simple client/server systems to full n-tier distributed systems. These are well documented and fairly simple to grasp, and can be implemented within the code base directly, within application configuration files, or within both. The .Net Framework, for example, can be used so that a specific approach is not forced, instead offering numerous alternatives, e.g., going with the grain instead of against the grain.

This, for example, can allow embodiments of systems 20, program products 30, and methods 90 to be deployed in multiple environments ranging from small start-up companies to large multinational organizations with remote offices. Additionally, as many developers require or desire a simple environment in which to build and test software, embodiments of systems 20, program products 30, and methods 90 of the present invention can support a fully distributed model for deployment. These embodiments also can provide "transparency" to deployment by building such configuration into base classes such as with object factories that can read the configuration files and code to perform configuration "behind the scenes" so to speak.

Further still, embodiments of systems 20, program products 30, and methods 90 can allow developers to build software without requiring application servers to be installed on their computers 26, 27, 28, or other machines, and embodiments of this H-Class Framework can allow the software to effectively run as a single process while still internally operating exactly as it would when deployed remotely, including transaction management and cache management.

Furthermore, these embodiments can allow sales/training personnel to configure systems quickly to demonstrate to clients, customers, or users, such as, for example, on a single laptop computer as understood by those skilled in the art. By allowing these embodiments of a framework or program product 30 to manage the complexities of the deployment, deployment can be as simple as copying files to the computer or machine without the need for complex configuration of application servers. Such embodiments of a framework or program product 30 can also include the ability to have the demonstration computers or machines configured to "skip" the login (debug facility), if desired, and thereby avoid the need to have an authentication web service configured, for example. Testing and deployment also can take the code and physically deploy it across multiple machines to simulate a client environment, and by changing the application configuration files, for example, the UI code can continue transparently in the remoted mode.

Embodiments of systems 20, program products 30, and methods 90 recognize that the .Net Framework provides various classes that can allow management of bandwidth utilized within a distributed application via channel sinks, for example, allowing the addition of custom encryption and compression of data, as desired, and as will be understood by those skilled in the art, but may not address directly how the classes utilize bandwidth. The .Net Framework through ADO.Net provides support for multiple databases 80 via native and generic providers. The native providers currently exist for SQL Server and Oracle, while other databases are supported through generic ODBC and OLEDB providers. To support multiple databases it is possible to force substantially all database (DB) access through a single OLEDB or ODBC generic provider at the expense of overhead of supporting these generic infrastructures. In reality, the native drivers offer far better performance as talking occurs directly to the respective database drivers such as Oracle.Net. The .Net Framework provides a means to get the best of both worlds through a common set of interfaces such as IDBConnection that all the providers support, so developers can use these to allow switching.

The H-Class Framework takes this issue by providing a managed class that exposes the required database connectivity objects such as IDBConnection, IDBCommand etc, while hiding the construction of the appropriate native providers from the developers. This can also allow it greater control over how connections are created, the management of connection strings, and transactions.

The .Net Framework provides several means of caching that can be utilized within an application, including having published a separate Caching Application Block within their Patterns and Practices website: http://msdn.microsoft.com/library/default.asp?url=/library/en-us/dnpag/html/caching-block.asp. This caching application block is built upon what is provided by the .NET framework to address common scenarios for the management of cached data both in WinForms and WebForms applications, but does not cover certain scenarios such that there is no guarantee that all access into the databases will be via a business services layer. No matter what approach was taken, there was a need for service programs, product to product integration programs, etc., to support the various tools written outside the .Net environment that, when updating a database such as database 80, could cause cached data to be invalidated.

Security is critical to applications and understanding how/where it is applicable and the type of security required is a key element to building any distributed application. Traditionally applications on the whole have relied on a database to store information on what user can have access to, i.e., what functions/screens and the actions they can undertake within those functions/screens. The following described security model is "Screen" centric and can apply access rights such as the "CRUD" model (Create, Read, Update and Delete).

According to a security model of the present invention, the user will generally log in via a login dialog where the user will enter username and password which is then authorized (compared) against data maintained within the database 80. Once authorized, the user's "Rights" are mapped via the user's id to tables containing the access rights. This might say: "User 'Fred' has Create, Read, and Update rights to the Order Entry Screen." When accessing functions within the applications code, the system 20 explicitly checks to see if the user has appropriate rights before a "restricted function" or "button" is enabled. An example of a code implementation might be as follows:

```
Private Sub Form1_Load(ByVal sender As Object, ByVal e As
System.EventArgs)
Handles MyBase.Load
    If (UserRightsChecker("OrderEntry", "U")) Then
        btnEditOrder.Enabled = True
    Else
        btnEditOrder.Enabled = False
    End If
End Sub
```

This function enables preventing particular operations from being performed by a user who does not have authority. According to an embodiment of the present invention, the UserRightsChecker code would either go directly to the database 80 to validate or check against a cache of this information stored in memory 24. This solution alone can work well with Client/Server applications where the only access to the database 80 is through the application, but other applications may need to be more open; and with openness comes security issues that need to be addressed.

Thus, advantageously, embodiments of the present invention can support/control the following: rich client GUIs connection via intranet and clients connection to databases directly with packaged tools (Excel, BI, Crystal, etc); web interfaces connection via the Intranet/Internet; web services; COM objects/.Net assemblies; and professional services organizations utilizing business services/Web Services. With COM objects/.Net assemblies, embodiments of the security model can control client access to components directly (restricting their access to internal components) providing access to specific components (COM Objects or .Net Assemblies) for clients. These embodiments can supply a single all encompassing solution to managing security for all of the above scenarios, more than a combination of solutions available through a combination of .Net Framework facilities, Windows Authentication and Product specific security classes.

As will be understood by those skilled in the art, certain terms are used herein and can be defined as follows:

Archive: A physical storage facility for data that is no longer needed on a regular basis, but which can still be accessed if necessary. Also the act of moving data to the archive.

Attribute: A quality or characteristic inherent in or ascribed to someone or something.

Content: The repository of all data that can be seen or heard.

Content Grouping: The mechanism used to group unrelated pieces of logical content together for financial or contractual reasons as well as to facilitate ease of entry, scheduling and tracking. Multiple grouping types are created and then related to each other in a hierarchical structure. For example: Content Grouping types=Program, Series Year, and Episode.

Program is related to Series Year as its parent and Series Year is related to Episode as its parent. The user can enter logical content for the half-hour comedy Friends at the program level that can be duplicated and re-used at the Series Year and Episode levels.

Contextual Metadata: Contextual metadata is usage-specific data that provides required information for various environments (regulatory, medium, etc). It is the metadata that affects the ways in which logical content data is used.

Edit Decision Lists—Dividing, combining, and manipulation of "essence".

Essence—That part of content that represents the information to be conveyed by the content. It is the part of content that joins with the physical aspects to create an object that can be utilized outside of the software.

Ingest—Act of receiving logical or physical content data into the software.

Library—A room or a server that has one or more library locations.

Library Location—A location is a placeholder that can consist of 0 or more Material Containers and 0 or more sub-locations. Examples are shelf, bin, room, section, file. Some locations must be able to be designated as non-storage.

Library Sub-location—a location within a location or a way to create a hierarchy for locations. For example: these can be in a "Room" a sub-level may be a "Section", in a "Section" a sub-level may be a "Shelf", in a "Shelf" a sub-level may be a "Bin", or a "Folder" may be it's own sub-level as a folder can be in a folder which can be in a folder.

Logical Content—consists of bits of information that can be gathered and searched upon about the essence, but that aren't necessarily attached to a physical object.

Material Container—the smallest entity that can be independently managed. Examples of Material Containers are: File, Tape, and Stream.

Material Container Management—The movement of Material Containers. May be a move to a new or different location or may be the check-in/check-out process.

Material Container Usage—A user-defined way to distinguish between different Material Containers based on how it will be used. Usage examples are: Air Copy, Backup Copy, Master Copy, and Clone Copy.

Material Container Types—A user-defined way to distinguish between different Material Containers. Examples of Material Container Types are: Tape, disk, tape, book, file, stream.

Material Container Batches—Material Container Batches are user-defined groupings of Material Containers for easier management of those Material Containers.

Material Status—A user-definable list giving information about what status the material is in. Sample values: "Waiting to be shipped", "Waiting for subtitle", and "Ready for Use". This is a place to start hooking in Workflow concepts.

Material Types—A user-defined way to distinguish between different materials. Essentially these are storage formats, for example: MP3, VTR.

Materials—essence on the Material Container and the metadata about that essence. Can have one or more material records per Material Container. Examples are MP3, PDF, PowerPoint, Video, Audio, Slides, and Pictures.

Metadata: Data about data. The combination of available metrics describing content. Metadata defines data and provides information about or documentation of other data managed within an application or environment. Metadata may include descriptive information about the context, quality and condition or characteristics of the data. For example, metadata is used to gather data about:

Elements or attributes—name, size, data type, etc.

Records or data structures—length, fields, columns, etc.

Data about data—location, association, ownership, etc.

Purge: The act of removing data permanently without regard to further access of the data.

Repurpose: Content may exist as one instance but may be utilized in many ways.

Script Lines—Individual instructions for edit decision lists.

Sequence Templates—Automatic Generation of identifiers (IDs).

Source Metadata: Core metadata is intrinsic data, generally created by the producer of the content, with attributes that tend to be static after ingest to the system.

Usage Metadata: Applied metadata is variable data, generated by the rights holder, with attributes that identify usage and operational data.

Version: The unique configuration of a programming event. A single program may be edited to a number of versions to suit the target audience, and the logical applied metadata content changes with each version.

Workflow/Process: Set of related steps that are linked together to create an end result.

Figure 2:
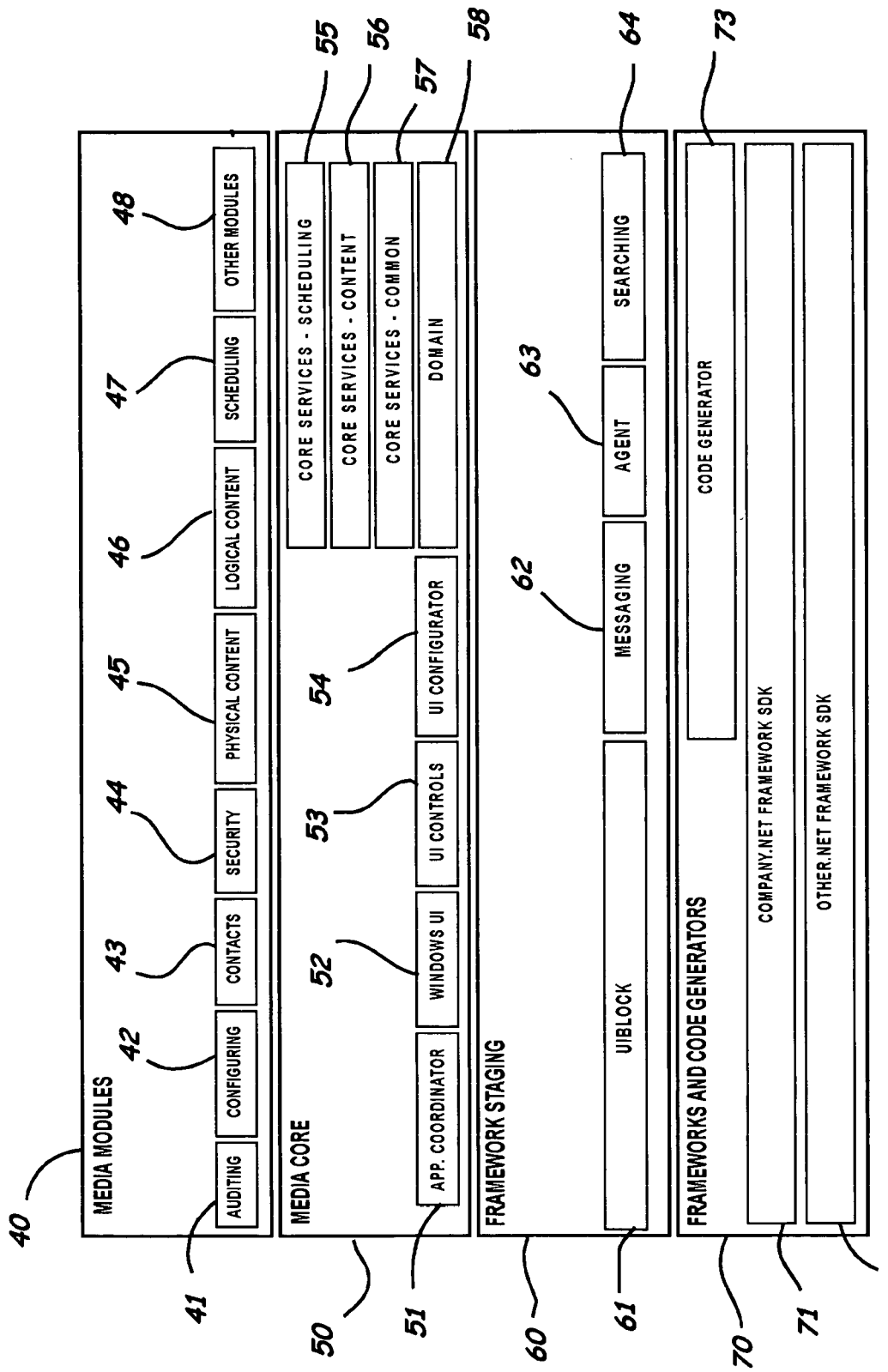
FIG. 2 is a schematic diagram of a system and program products according to embodiments of the present invention.
Figure 3:
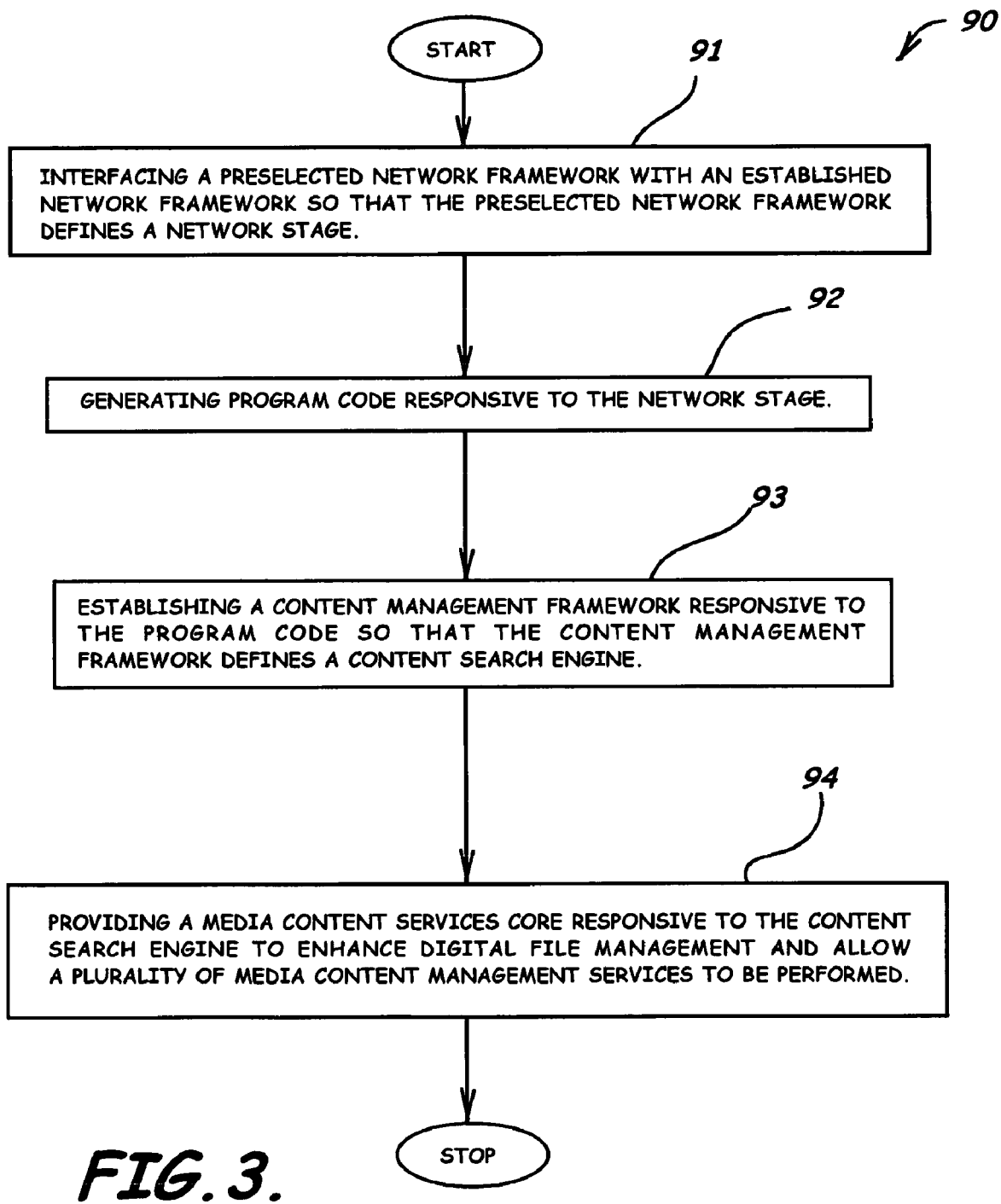
FIG. 3 is a flow chart of a method of content management according to an embodiment of the present invention.
Figure 4:
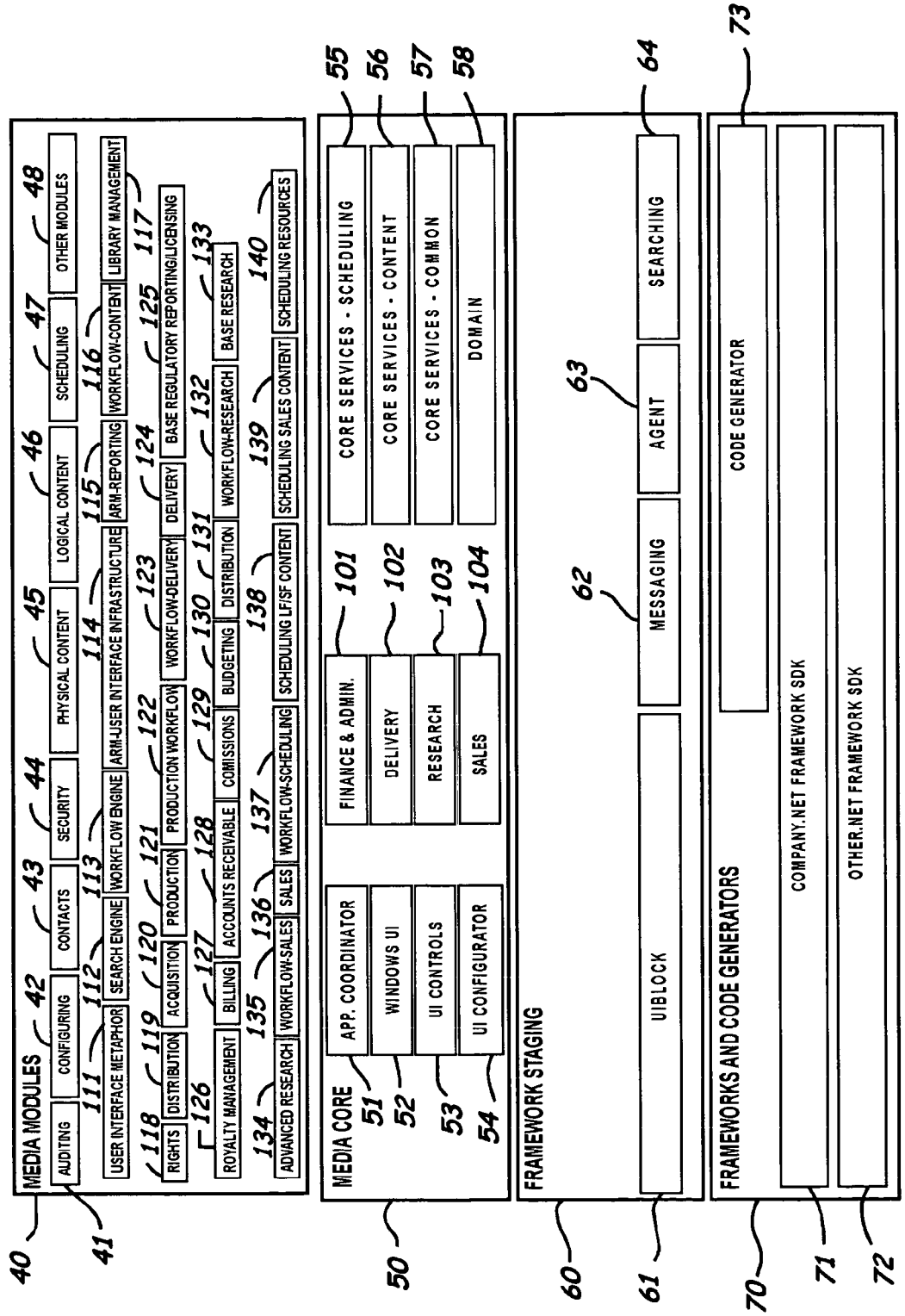
FIG. 4 is a schematic diagram of a system and program products according to embodiments of the present invention.

As shown in FIGS. 2 and 4, embodiments of a system 20 and/or program product 30, for example, can be broken into four distinct "blocks" (or blocks of software code or program product), these are the media modules 40, media core 50, staging 60 and framework 70, sometimes referred to collectively as the "H-Class platform." The framework 70, for example, can be an Enterprise Framework that abstracts the technology underpinnings from the business of writing applications, thereby freeing application developers to focus on providing business solutions, not building technology to support the applications. The goal of this Enterprise Framework is to "hide" the complexities of a Microsoft .Net Framework, as understood by those skilled in the art, and thereby provide a simplified set of commonly required functionality in a manner that promotes consistency within a single product and that promotes re-use across multiple products and development teams. The framework 70 can provide common domain-centric approaches to development and can include commonly needed capabilities centered around domain-objects and an internal identification system. All domain-object types have unique identifiers as does every property on an object. These are maintained and monitored through a unified modeling language (UML) model to code generation process. This gives the system 20 the capability to have features such as auditing, searching, configuration, caching and user interface (UI) controls, for example, that can all utilize this common identification process and simplify the management of objects through typed code and code generation. Most auditing environments can use column names and object names to identify information that has changed in the system. This is open to changes in the names of these objects through the life of the system, reusing names that were previously released and storage of this in the databases. Through a combination of unique identifiers (IDs) and code generation, embodiments of a system 20 can ensure that regardless of column name changes the IDs remain unique and no code or database needs to be changed for auditing or searching information stored in the database.

An, e.g., .Net framework embodiment of a system 20, for example, can include a first preselected network framework 72, e.g., a Microsoft.net framework, defining a first network stage and a second preselected network framework 71 responsive to the first network stage and defining a second network stage providing a common basic infrastructure that is industry generic. The system 20 can also include a code generator 73 responsive to the second network stage to generate program code thereof. The system 20 can also include a framework stage 60 responsive to the code generator to establish a content management framework for inclusion in the second network stage 71. The framework stage 60 can include, e.g., a user interface block 61, message block 62, agent block 63, and searching block 64 defining a content search engine.

Figure 5:
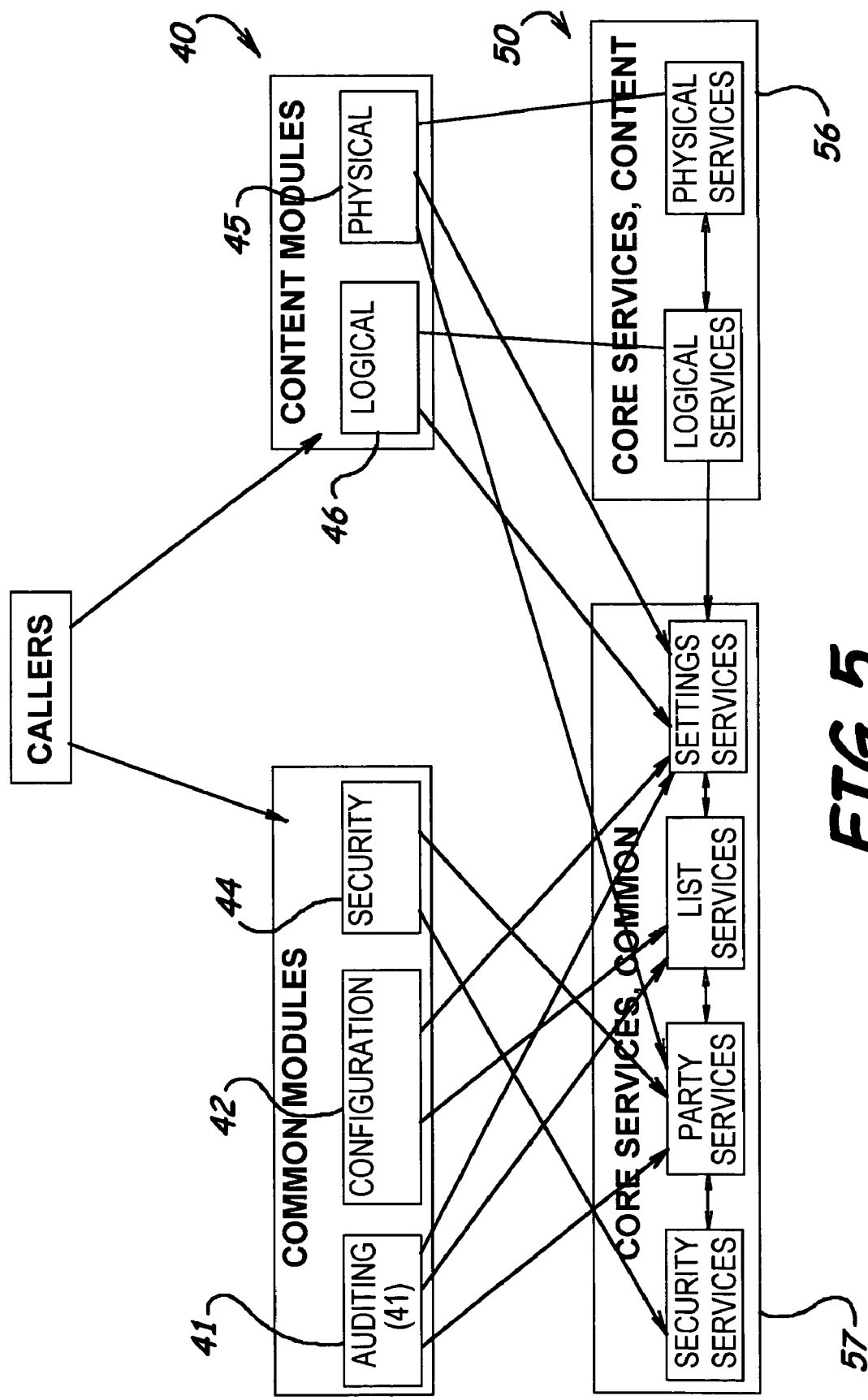
FIG. 5 is a schematic block diagram illustrating exemplary relationships between media modules and media core modules according to embodiments of the present invention.

The system 20 can also include a media content services core 50, which responsive to the content search engine 64, can enhance digital file management and allow a plurality of media content management services to be performed. The media content services core 50 is generally media specific and provides core reusable components/modules. The media core 50 contains implementations of core functionality, such as, for example, save, delete, and retrieval capabilities for a domain object 58. Core services contain generic, robust service implementations that are shared amongst modules. Core service implementations emphasize class capabilities and associations, not context. Core services can contain all generated service (business and data) code. Further, core services can expose internal API to the media modules 40. Such components/modules can include an application coordinator 51 which can provide security management such as, assignment of permissions via a user login; a Windows user interface 52; a user interface controls module 53; a user interface configurator 54, and various other core modules including, e.g., scheduling 55, content 56, common 57, delivery 102, finance and administration 101, research 103, and sales 104, along with domain objects 58. As shown in FIG. 5, core services such as, for example, modules 56, 57 can call other core services directly, passing parameters and receiving domain objects 58, in return.

The system 20 also includes a set of media content service modules 40, which responsive to the media content services core 50, can perform content management services to media. The media modules 40 contain context specific implementations of media core services 50. These are provided to allow users of the services to have contextual access to services that may exist in multiple discreet media core services. These module services provide a level of abstraction from the underlying implementations and are aimed at reducing the complexity of understanding required by the users of the services. For example, as shown in FIG. 5, core services common 57 can include security, auditing, list and party services, etc., which can be called with different parameters and combinations by any of the media modules 40. Auditing 41 can provide several methods that are contextual to auditing, such as, for example, Auditing.GetUserForAuditRecord(Class AuditRecord). This module can redirect the call to core services 57, e.g., Security.Services.GetUserForAuditID(AuditRecord.id). The abstraction removes the need for a user ("caller") utilizing auditing 41 to understand the need to call Security. Services to get a user for a specific audit record.

The media modules 40 are intended to be deployed with client software and can also manage remote connectivity to application servers via HTTP/SOAP or TCP utilizing framework and code generators 70. The modules 40 represent a client-side facade that hide the complexity of the underlying core services layer. For example, the security module 44 details user permissions assignable to a user and the application coordinator 51 performs the assignment thereof. As perhaps best shown in FIG. 5, the modules 40 can call modules to provide contextual information. The information that flows from specific media modules 40 to core services 50 are parameters to execute methods and the data returned is in the form of domain objects or domain object collections 58 or exceptions. Similarly, framework staging 60 and framework services 70 are internal and can be called by the media core 50 and/or media modules 40, directly. For example, searching 64 has associated media modules 40 identified by the other modules 48 which can function to call it, directly.

Embodiments of the framework 70 of a system 20 or program product 30, e.g., stored in a computer medium and including instructions and/or commands as understood by those skilled in the art, can also include custom data types that support media data types such as impacts, ratings, and broadcast time that provide unique rendering and data entry capabilities that support decimal place adjustment as well as clocks that are greater than twenty-four (24) hours. The framework layer 70 also provides core routines (implementations of open source "best practices and patterns" as understood by those skilled in the art) abstracted so that developers have common utilities (e.g., for a manufacturer, producer, or distributor of embodiments of a system or program product) for common tasks. The approach is to utilize best practices in the industry while maintaining control over the usage and implementation. This allows an embodiment of a system 20 or program product 30 to control the deployment of new versions, as well as the code impact of changes to the open source code. For example, embodiments of a system 20 or program product 30 can include or use versions of MS Data Access Block, MS Exception Block, Log4Net, MS User Interface Block (MVC pattern) as understood by those skilled in the art. An embodiment of a system 20 or program product 30 also can have one or more key extensibility features of the framework such as the agent manager process 63 that captures all object changes in the system 20 via a messaging framework, allowing clients to perform custom development and provide H-Class products to respond to changes made post transaction in an asynchronous manner.

The framework code generation process 73 can be integrated into the build cycle and covers areas from domain-object, service class, security permissions, UI-helper classes, search index and formatting classes. The framework 70 features are, by design, enforced through a series of code generators that are targeted at coding efficiency, standards, and ability to make system wide changes with the minimum of refactoring. For example, all service modules developed within H-Class MBS are code generated with the ability of the developers to override the default code generated functionality as needed. Also for example, to ensure absolute compliance to the process the domain-objects may be only generated from the UML model directly so that the unique IDs for the object type and properties can be maintained for any information persisted to the database.

According to an embodiment of the present invention, the media core 50, for example, application coordinator 51, windows user interface 52, user interface controls 53, user configurator 54, domain 58, core services common 57, core services content 56, and core services scheduling 55 as will be understood by those skilled in the art, can be designed to be an integral part of the "H-Class platform" and non-replaceable, but are to be built upon by media modules 40. These core components are built upon the framework 60, 70 to provide core functionality for the system 20 and require a higher level of integration with the framework 60, 70, itself.

The media modules 40 have been designed to provide functionality that can be optionally included in the media product. For example, the media content service modules 40 can be selected from the plurality of media content management services, e.g., auditing 41, configuring 42, contents 43, security 44, physical content 45, logical content 46, scheduling 47, and other modules 48, such as, for example, user interface metaphor 111, search engine 112, workflow engine 113, ARM-user interface/infrastructure 114, ARM-reporting 115, workflow-content 116, library management 117, rights 118, distribution 119, acquisition 120, production 121, production workflow 122, workflow-delivery 123, delivery 124, base regulatory reporting/licensing 125, royalty management 126, billing 127, accounts receivable 128, commissions 129, budgeting 130, distribution-billing 131, workflow-research 132, base research 133, advanced research 134, workflow-sales 135, sales 136, workflow-scheduling 137, scheduling LF/SF content 138, scheduling sales content 139, and scheduling resources 140, described below in Table I.

An embodiment of a platform as a program product 30 or software can cover two areas, infrastructure and content. The infrastructure can establish the common base for all future modules and can include auditing, security, searching, system configuration and a common user interface structure. The content portion of the program product 30 can support content metadata capture and physical content library management.

The auditing module or auditing 41 can utilize the agent module or agent 63 of the framework to implement auditing for the system 30. The auditing module 41 can be self-auditing, provide a method of tracking changes to data in the system 20, provide a method of tracking access to the data in the system 20, provide a method of building "transaction activity trails," and provide a method of tracking all activity within the database 80 and any system-initiated out-bound activity. The auditing module 41 can also support data change transaction reporting necessary for Sarbanes-Oxley compliance and can provide an automated alert system for proactively alerting out-bound activity. Note, this module 41 could be replaced with a client specific version of auditing if desired or not required.

The configuring module 42 or System Configurator is the repository of information that can drive the behavior of the system. These embodiments can support the ability to create system settings and switches, system and user defined lists and the definition and control of agents. Multiple types of agents are supported including by way of example the following:

Watchers—An agent that watches the properties of an object for any addition, change, delete, etc, for example, to watch the system for any manual changes made to security permissions. As additional system areas, such as sales and scheduling, are added, a Watcher could look for any order or spot being cancelled.

Analyzers—An agent that allows users to evaluate information. For example, an analyzer can watch the system for any salesperson selling for more than 5% below the set rate card.

Assistants—An Assistant is an interactive guide used to walk the user through an unfamiliar task, step-by-step.

Alerts may be used by system agents to transfer messages, announcements or time sensitive notifications throughout the system. Examples of alert usages are:

A Watcher may be configured to send an email to the sales manager when a rate is changed on an order.

An Analyzer may be configured to send an email to the administrator when a user's security is about to expire.

The contact module or contacts 43 can provide the following features: creating and maintaining contacts for both business (organization units) and users, establishing contact (person and business) relationships, establishing business contact hierarchies, and sharing of business contacts and addresses. The basic organizational unit and users created may have attached contextual usage data which allow creation of clients, agencies, producers, distributors, and advertisers, etc. Relationships may be defined between two contact types with a contextual focus to the relationship, i.e. advertiser/agency, producer/distributor, agency/sales executive, agency/station, etc. The contact module 43 can have a hierarchical structure and a person or business contact relationship can be established at any level within the hierarchy to define complete corporate organizational hierarchies. These contextual relationships will establish a media/content-centric CRM function that will be used by all areas of the system.

In an embodiment of the program product 30, a common user interface structure can be provided which can include common controls and standards to support the "search and act" approach. This implies an efficient search mechanism of metadata, as well as several "form types," i.e., data form, grid form, text form, schedule form and relationship form. Definitions for these screens can be documented in a Human Interface Guide (HIG).

The security module 44 or security foundation can provide the ability to grant access to system and application resources, actions (i.e. view, add, delete, etc) allowed in using those resources and can grant access to data to establish organizational units, users, roles, and the relationships between each. The security module 44 attaches roles and their attached permission sets to the organizational unit and user relationships created by contacts 43. For each relationship, base security permissions are created which define system resources and the actions (i.e. view, add, delete, etc) available for those resources. The security module 44 can provide the ability to assign: permissions (1 resource+1 action) to roles, users to roles, and roles to organization units.

The content, e.g., physical and logical content modules 45, 46, or content deliverables can allow capture and search of source, usage and context metadata. The search will support basic listings of content, display of content relationships such as sequels and genealogy, and hooks to physical media for video/audio playback of content. Genealogical relationships may be created using Edit Decision Lists (EDLs). Distribution packaging, financial packages, content sequels, episodic series, content scripts, promotional and marketing material, and scheduling packages can be created, tracked and displayed. It can support Library Management for physical media, including tracking of all types of physical media, (digital servers, tapes, cassettes, CD's, paper) and appropriate library functions for content form control such as check-in/out, reserve booking and re-cycle. Additional functional detail for Logical Content follows.

The logical content module 46 or engine can be built to capture and store metadata from a multitude of sources (handling various formats) that can be accessed by different types of users for any number of reasons. These, for example, can include: programming, promotions, identifiers, and advertising. Logical content can be searchable and can include provisions for filters and multiple sorts. The logical content module 46 can build content grouping mechanisms, store and assign images, integrate seamlessly with physical content, and can link to contacts, actor's bios, and such. Logical content can include content relationships (genetic or natural association) between two or more pieces of logical content that is traceable, showing metadata lineage—the genealogy. See for example, co-pending U.S. Provisional Patent Application No. 60/712,051, by Bugir et al., titled "System, Methods, and Program Product to Trace Content Genealogy," filed on Aug. 29, 2005 and U.S. Non-Provisional patent application Ser. No, 11/305,871 titled "System, Methods, and Program Product to Trace Content Genealogy" filed on Dec. 16, 2005, which is incorporated herein by reference in its entirety. Content relationships can include, for example: content predecessor, content successor, inherited rights/rules and metadata. Deriving content from one or more parents automatically generates a genealogical relationship. Content relationships can be displayed and content lineage can be tracked in all directions. Content's genetic relationship can be used to create: version and repurpose. Logical content can include content grouping (artificial association). Such grouping can include the mechanism used to group non-familial pieces of logical content together in order to establish financial or contractual rights, and facilitate ease of entry, and scheduling and tracking. Multiple grouping types can be created and related to each other in a hierarchal structure. Content groupings offer a marriage mechanism between artificial and natural (genetic) groupings. Content grouping relationship group content can include, e.g., scheduling, sales, financial, and research. Content grouping hierarchy can include, e.g., program-season/year-episode and deal-contract-package.

Additional functional detail for physical content follows: The physical content can include library location types and library locations. The physical content module 45 can allow for an unlimited ability to create locations and sub-locations to thereby create the library hierarchy, and an ability to limit what levels can be used as storage for material containers. The physical content module 45 can also use location types to create hierarchy of the library system and automatically generate names. The physical content can also include material container usage, material container types, material containers, and material status.

Material container usage can provide an ability to prioritize—air copy more important for play-out than backup copy, and can provide an ability to set loan days for ease of use in checking in and out of material containers. Material container types can provide an ability to set defaults for creating one or more material containers. Material containers can provide an ability to add, change, inactivate, activate, and copy one or more material containers at a time, an ability to move one or more material containers to a new location, and an ability to check-out/in one or more material containers. They can also provide an ability to reserve check in/out or booking, set one or more owners (contact organization unit) of a material container, and an ability to automatically generate the IDs for material containers and track shipping of physical media, e.g., historical tracking of check in/out, movement and shipping. Material status can provide an ability to set one or more status as "Ready for Use" to be tied later to scheduling, and an ability to set one or more status to "Need Dubbing" for dub list. All materials can be user defined by type and can, for example, provide an ability to set type of material—JPEG, MP3, and PDF, and can allow for material types defaults on materials for ease of entry. An audio material will not display video attributes. Materials can provide an ability to add, change, inactivate, activate, and copy one or more materials at a time, an ability to display fields applicable based on type, an ability to see multiple layers (materials on containers/logical on materials), and an ability to purge or wipe.

Physical content can also include embedded materials and an ID manager. Embedded materials can be handled as own material, but are linked to parent material. Embedded materials are automatically created when the parent is created. The physical content module 45 can use ID decorations for embedded materials. For example, if Video ID=V12345, then embedded can be appended or prepended or same to show language distinctions such as: V12345 (English), V12345F (French), GV12345 (German), and MV12345S (Mono/Spanish). The ID manager can provide material container batch numbering; templates for logical content IDs; wizards to create multiple material containers; materials and link to logical content metadata; integration with Arkemedia Ingest Manager, e.g., ingest material, playback material; edit decision lists, e.g., timings (in/out times on material), virtual (from logical—dividing and combining materials); and edit rates, i.e., fully user defined frame or sub-second rates.

The schedule module 47 can provide a context focused approach to scheduling all non-commercial content, which can make use of the EDL work provided through library management, respect placement rules and rights and restrictions, and can provide both long-range and short-range scheduling views. The approach can be real-time and incorporate a scheduling UI metaphor which can define types of UI screens so that the media can be repurposed in delivery; creating saleable inventory as the module 47 handles the creation and management of programming.

Other modules 48 illustrate that the various other modules, described later, can be included or otherwise associated with the media modules 40. For example, the system 20 or program product 30 can provide a generic search engine that is capable of searching across all domain objects including NextGen domain objects. Embodiments of program product 30 can support query-based searches like Yahoo® and Google® and support further compounding of searches to refine the target search. These embodiments can also support the ability to look into fields so that the non-structured data in a metadata field can be targeted e.g. words in a synopsis field for a content item. Additionally, the search engine can accept parameters to ensure that only select "types" of data are searched, e.g., video only, orders, advertisers, etc.

Additional embodiments of systems 20 and program products 30 can enhance infrastructure and add more function to the content area. The infrastructure enhancements include business contacts for all areas of the system, a basic workflow engine, security enhancements, and a common reporting services structure. The content portion of the release will support content rights management and content scheduling through delivery.

According to an embodiment of the present invention, the basic organizational unit and users created for security are enhanced to add contextual usage data to allow creation of clients, agencies, producers, distributors, and advertisers which establish the contact system. These business types and users can then be linked to establish common business relationships. Relationships can be defined between two contact types with a contextual focus to the relationship, i.e., advertiser/agency, producer/distributor, agency/sales executive, and agency/station. These contextual relationships can establish a media/content-centric CRM function that can be used by all areas of the system.

This embodiment, for example, can be used either in an existing Encoda® workflow engine or a commercially available engine that is capable of workflow definition, task routing, and workflow management. It can establish generic APIs and wrappers that can allow ongoing integration of system metadata with the workflow tasks.

Security 44 can support additional security filters based on ownership, date/time, status and locks applied to a specific resource. Ownership security can allow access to specific data within the system based upon the user assigned role within the organizational hierarchy, for example a local sales manager may only see orders that are booked by local salespeople while a general sales manager may see all orders.

A reporting services structure can be provided to serve several purposes. It can provide clients a continuity of reporting during migration. For example, this can be a current Encoda System to an embodiment of the system 20 as described herein. It can provide a tool for professional services to leverage consulting sales, and can add value to existing Encoda Products. By divorcing UI from functionality, it allows the provision of cosmetic upgrades as time progresses, creating a fresh look with relative ease, divorcing dependence upon a reporting engine be it Crystal or Microsoft Reporting Services.

Content Rights and Usage Rules can be provided to allow the capture of all rights and rules metadata and can track how rights are managed and inherited via content relationships. This embodiment can lay the foundation for content "DNA" sequences that can ultimately, with the distributor and production systems, allow a producer to track any airing of an identified content sequence. Content amortization, direct expenses and content payables schedules can also be supported. Financial deals can take into account the number of runs, number of viewers, or pay per view information. Content amortization may be based on multiple formulas, direct or run based, and can be either actual or projected. Direct content expenses such as dubbing costs, etc., can be tracked and included as desired within the amortization expenses for content. Payables schedules can track payment information for content and may be triggered by usage and receipt information. Business content rules that are not directly related to rights such as preferred scheduling periods, content separation rules, ratings, and censorship (violence, nudity, explicit language, etc) may be defined. These items can be tied to the scheduling engine; a context focused approach to scheduling all non-commercial content.

According to an embodiment of the program product 30, scheduling 47 can use an EDL work provided through library management 117, respecting placement rules, rights, and restrictions. Scheduling 47 can provide both long-range and short-range scheduling views, and can create and manage content delivery formats. Scheduling 47 can also include drag'n'drop multi-stream (multi-media) concurrent delivery schedules.

Further embodiments of systems 20 and program products 30 can focus on sales and research with additional enhancements to the auditing and agent infrastructure. A Research function, e.g. research module 133, can support the capture and utilization of the basic data used in broadcast systems. A Sales function or area can support entry and management of both spot and non-spot (sponsorships, etc) broadcast orders.

The Research 133 can include the quantitative research data needed for broadcast, cable, and radio, including international requirements for both commercial and non-commercial content. It can use components from existing systems where applicable, which have been re-worked to fit into the system framework. It allows for respondent and aggregate level data and can provide basic analysis similar in scope to competitors (TvScan®, One Domain™, InVision®, etc.). Basic reporting can be available in these embodiments, as well.

The sales module 136 allows for the trading between an agency/advertiser and media seller. This embodiment, for example, focuses on the touch points necessary to create and manage the contract or deal. It can use previously released components that support CRM for user and buyer details. The deals and campaign infrastructure can be set up to cover any media and any delivery mechanism. Inventory infrastructure needed to manage this inventory can be defined, including breaks, pages, sell patterns, etc. along with items like reporting category and clash code. Pricing control tools can also be delivered.

Embodiments of content program product 30 can further support the management of commercial content. Both purchased inventory and its assigned content can be scheduled. These schedules (logs) can be delivered to the broadcast delivery system and schedules can be reconciled for actual delivery.

Billing module 127 can also be included to allow invoice calculation and generation. Information can include payee name, summary of all the events, and billable items (some may be pure invoice line items). Embodiments of a system 20 or program product 30 can check for all invoice details across the time line of the database to pick up credits and so forth. An embodiment of a simple accounts receivable system or module 128 for the management of receipt of payments against invoices can also be included.

Further still, embodiments of a system 20, program product 30, and methods 90 of the present invention can add a new function for each of the research, content, finance and sales areas. The research area can move in multimedia. Content can add support for content acquisition planning and production. The sales area can be completed with the addition of proposals and order approval and management workflows. Content, sales and resource budgeting can be added to the financial reporting systems along with basic regulatory reporting.

The portion can include the quantitative research data needed for additional mediums: internet, print, outdoor, etc., including international requirements for commercial and non-commercial content. It can use components from existing systems where applicable, which have been re-worked to fit into the framework of the system 20. It can also provide basic analysis and reporting for the additional mediums.

A Content Acquisitions module 120 can determine the profitability of a single program or series based upon sales, ratings, and sellout assumptions for the operation. This includes reasonable estimates on projected return on investments under different purchase scenarios, and needs analysis based upon already owned content, and facilities to provide accurate tracking of the content purchase negotiations process.

Working with non-linear, random access editing systems, these embodiments can allow all production editing metadata to be captured and stored within the content library. Scheduling and tracking tools that tie together content metadata and resource scheduling data, and produce production project tracking and costing information and alerts, can support different types of production such as long form movies, series, and live programming (sports, news, award shows). Resource scheduling is focused upon the scheduling of resources such as studios, cameras, routers, switchers, and staff, in such a way that allows an organization to further leverage that scheduling and match it to delivery streams.

According to any line of the system 20, a Sales or Sales Proposals module 136 can support multi-media campaigns or activities that can be "proposed" to the buyer. Optimization from research can also be utilized at this level. This embodiment of a module 136 can focus on the booking and optimization of revenue for multiple specific market requirements such as, for example, CPT/CPP, spot booking, program sponsorships, targeted advertising, and other new developing sales models. Sales workflow to track media negotiations and contract approvals across trading partners can also be included.

Financial tracking and reporting of budgets across sales, content, and production further can be included. A Content Budgeting module 130 can focus on the budgeting required by program schedulers and content acquisition/commissioning staff. This involves setting budgets by media, channel, genre, season period or day, and plotting spending against these budgets. Content purchase budgets may also be monitored against actual sales revenue. These functions allow for planning and ROI assessments. Revenue (Sales) budgets to track advertising sales may be set for sales person, manager, group, program, delivery stream, and advertiser and can be capable of a top down or bottom up approach. Predicted revenue may be entered into a specific timeframe along with other non-revenue based information (CPT, minutage, ratings etc., allowing for an assessment of inventory pricing as well as simple booked versus estimated reporting. Resource and production budgeting can allow producers to create and track expenses for resources at a project level. Actual production costs may be compared against budget.

A Regulatory Reporting module 125 can be provided to ensure storage of the appropriate attributes and data-structures to satisfy a generic approach to regulatory reporting. In addition basic children's and political reporting for US domestic regulations can be supported. Specific country regulatory reporting can be handled as the system 20 is provided to those countries.

According to another embodiment of the present invention, a content distribution module 131 and enhancements to research 133, 134, finance billing 127, accounts receivable 128, commissions 129, and royalty management 126, can be added in these embodiments of systems 20 and program products 30. Digital stream management can be introduced in the delivery area.

Program sales 136 may be initiated by the program producer, by distributors or rights may be on sold by qualified rights holders. Content distribution can allow sales of content rights and ensure that exclusive rights issue and all distribution rights are adhered to. Building from the "DNA sequence" foundation, this can allow a distributor to track airings of content and reconcile those airings to content rights contracts.

Research 134 can include the ability to hold and analyze data from "new" feedback loops including Tivos and single source respondent data from Apollo (VNU/Arbitron project), etc. The ability to "merge" appropriate data across mediums, regions, etc. through creating a "common denominator" that can be used to analyze and compare disparate data.

The finance area or Billing module 127 can add enhancements to support the tracking and invoicing of content payments and distribution rights payments. These invoices can use the basic invoicing engine with enhancements and integration of other non-time invoicing areas. Credit checking information and management of that against bookings versus AR will also be supported with this release.

The Commissions module 129 can support the extraction of data from the sales and accounts receivables systems to allow calculation of salesperson commissions. An example of route for managing this is through an API to an HR system. Rules for calculating the commission can be held within the system 20 and can include percentage of revenue generated in a month versus sales target. Any invoice query and subsequent credit can also be taken into account as part of a commission calculation.

Royalty management 126 can extend rights management with ties to regulatory reporting/requirements (e.g., ASCAP, BMI, etc.). Royalty management 126 can take the basic rights/financial relationships and create a financial trail of currency back to the original contract and/or content owner as a tangible manifestation of the value of "rights genetics." These transactions can be used to calculate royalties which can then be posted to an accounts payable module. Digital stream management including bandwidth management, network distribution routing, switching and satellite distribution for both record and play out can also be provided.

Further embodiments of systems 20 and program products 30 can focus on research 134, delivery 124, and infrastructure productivity tools. Research 134 can add modeling and optimization analysis. Delivery 124 can support real time machine control and tools added to assist in security setup. Research 134 can incorporate qualitative data into the system 20, including stand-alone data, and the ability to "weight" quantitative data. Research 134 can provide robust optimization analysis including advanced modeling and pattern recognition resulting in suggested rule modifications.

The Presentation EDL provided through delivery module 124 can allow real time changes to a digitally based broadcast schedule. These embodiments also can use that real time EDL to control video server/digital device playouts. It can also provide integration with the DAL automation systems for analog playout control. These embodiments further provide a set of tools to allow easier setup of security functions, not only for internal users, but also for an external user community.

The following Table I describes in further detail numerous examples of modules 40, their stages of implementation, and their affiliation with the meta core modules 50, as illustrated in the schematic diagrams of FIGS. 2 and 4:

TABLE I

| Module/Stage | Description | Location |
| --- | --- | --- |
| Auditing 01 | The Auditing Module can be self-auditing. Auditing 01 can provide a method to track changes to data in the system, track access to the data in the system, build "transaction activity trails", and track all activity within the database and any system-initiated outbound activity. | Common |
| Auditing 02 | Auditing 02 can provide reporting capabilities, and an automated alert system for proactively alerting out-bound activity. | Common |
| Security 01 | Security 01 can establish the building blocks for security: organizational units, users, roles and their relationships. Within each relationship, hierarchical based permissions security can be created to define the resources and actions available for those resources. Organizational units can be created to easily apply security. | Common |
| Security 02 | Security 02 can support additional security filters based on ownership, date/time, status and locks applied to a specific resource. Ownership security can allow access to specific data within the system based upon the user assigned role within the organizational hierarchy, for example a local sales manager may only see orders that are booked by local salespeople while a general sales manager may see all orders. | Common |
| Security 03 | This deliverable can create a set of tools to allow easier setup and tracking of security functions across not only internal but also an external user community. | Common |
| UI Metaphor | The UI Metaphor deliverable can define the types of UI screens that can be used to engage users, including the capabilities, usage, and look and feel. Currently the prime metaphor is a "search and act" approach, an efficient search mechanism of metadata, as well as several "form types" I.e. data form, grid form, text form, schedule form and relationship form, and can define the navigation between forms/screens. Definitions of the screens can be documented in a Human Interface Guide. | Common |
| Search Engine | The Search Engine deliverable can provide a generic search engine that can search both indexed and non-indexed, and structured and non-structured data, in the database. The intent is to support query-based searches like "yahoo/google etc." and support further compounding of searches to refine the target search. It can support the ability to look into fields so that the non-structured data in a metadata-field can be targeted, e.g. words in a synopsis field for a content Item. The search engine can accept parameters to filter select "types" of data e.g., video only, orders, advertisers, etc. | Common |
| Workflow Engine | The Workflow Engine deliverable can explore workflow engine options. It may simply result In the development/definition of generic API's and wrappers to support commercially available engines and stubs for subsequent deliverables or it may define an engine that is capable of base routing and workflow management. It can research the workflow engine Archemedia ® has created as an option. The long-term objective is to develop a mechanism that can support the configuration of deliverables (lego's) for organizations and/or view a collection of deliverables and be able to map the workflow and configuration of an organization. The point here being to provide professional services and support staff with a tool to configure/reconfigure the system as part of an ongoing service/maintenance agreement. | Common |
| ARM - UI/Infrastructure | This deliverable can re-engineer ARM to be the reporting tool for the system. It can ".netify" the current product that has been developed in Delphi ® and make it capable of the system framework service offerings. It currently utilizes Crystal Reporting and can be revised to eliminate dependence upon a specific reporting engine which can allow use of Microsoft Reporting Services, etc. | Common |
| ARM - Reporting | Business reporting requirements identified in other system deliverables can be incorporated as appropriate. | Common |
| System Configurator | The System Configurator 01 deliverable can manage settings across all modules and can manage system, user, and user value lists. It can provide the message queuing framework to support communication between distributed processes. It can provide the infrastructure to create and manage Watch Agents which can monitor domain objects. | Common |

TABLE I-continued

| Module/Stage | Description | Location |
|---|---|---|
| System Configurator - 03 | This deliverable can focus on the use of agents to analyze and deliver information to the user, including enhancing annerts (additional annerts based on subsequent module deliverables), and adding the infrastructure for complex agents and assistants. | Common |
| System Configurator - 02 | This deliverable can build on System Configurator 01 by enhancing settings, switches (additional switches based on subsequent module deliverables), configuration parameters (additional parameters based on subsequent module deliverables), and lists (additional system, user, and user value lists based on subsequent module deliverables). It can include the infrastructure to create templates and screen flow models. | Common |
| Workflow | The interface from content to the workflow engine, It describes all of the required content touchpoints as well as the interface to the engine from content with respect to other modules and subsystems of system. | Content |
| Library Management 01 - Engine (Logical Content | The Library Management engine can allow capture of basic, core, applied and context metadata. It can contain appropriate hooks for the rights and rules metadata that can be added with the content rights projects. Hooks can also be available for the addition of EDLs. Basic content relationships and genealogy can also be included. | Content |
| Library Management 02 - Physical Media | Physical media library management can tie the content metadata to physical media using basic EDLs. All types of physical media (digital servers, tapes, cassettes, CD's, paper), along with appropriate library functions for content, form control such as check-in/out, reserve booking, re-cycle, can be supported. | Content |
| Library Management 03 - Enhanced Content Relationships | This deliverable can create content genealogical relationships (versioning, repurposing) using EDLs. It can allow for the creation, tracking and displaying of distribution packaging, content sequels, episodic series, content scripts, promotional and marketing material, and scheduling packages. The content search can allow listing of content, and enhanced display of certain types of content relationships such as sequels and genealogy along with hooks to physical media for video/audio playback of content. | Content |
| Library Management 04 - Advanced | This deliverable can complete the metadata storage area by adding in the remaining pieces of the applied metadata and contextual metadata. It can add additional capture functionality by increasing import/export formats; AAF, MXF, PMCP, Vyvx, Pathfire, DG Systems, Pinnacle Systems, Grass Valley Group, Encoda's DALdb. It can enhance editing and view/review capabilities by allowing mass editing capability, the creation of a view/review area for external data before ingesting it. It can enhance search capabilities through sorts/filters and reporting/outputs. It can add links to notification functionality through automated email (notification) warnings for missing metadata and can provide the ability to access the email (contacts) system for notifying external vendors. It can complete integration with physical content and design the connection and link to content rights/rules. The content relationships can be completed. | Content |
| Rights 01 - Inheritance Management | Content Rights Inheritance Management allows the capture of all rights and rules metadata and tracks how rights are managed and inherited via content relationships. This deliverable can lay the foundation for "Content DNA ™" sequences that can ultimately, with the distribution and production systems, allow a producer to track any airing of an identified content sequence. | Content |
| Rights 02 - Financials | This deliverable can include content amortization, direct expenses, and content payables schedules. Financial deals can take into account number of runs, number of viewers or pay per view information. Content amortization may be based on multiple formulas, direct or run based, and can be either actual or projected. Direct content expenses such as dubbing costs etc. shall be tracked and included as desired within the amortization expenses for content. Content payables schedules can track payment information for content and may be triggered by usage and receipt information. | Content |
| Rights 03 - Rules | Business content rules that are not directly related to rights such as preferred scheduling periods, content separation rules, and ratings and censorship (violence, nudity, explicit language, etc) can be defined within this deliverable. These items must be tied to the scheduling engines. | Content |
| Rights 04 | Placeholder for Rights 01–03, since the previous deliverables may need additional time to achieve all objectives. | Content |
| Distribution 01 - Content Sales | Distribution 01 can manage and track sales of content rights. Contractual content rights must be managed across all contractual sales to insure that exclusive rights and distributions rights are adhered to. Program sales may be initiated by the program producer, by distributors, or rights may be sold by qualified rights holders. | Content |
| Distribution 03- Rights Tracking/Feedback | Building from the "Content DNA ™" sequence foundation from the Rights 01 deliverable, this project can allow a distributor to track airings of content and reconcile those airings to content rights contracts. | Content |
| Acquisition | Program purchases are the single biggest cash outlay for any broadcaster, and the program acquisitions process itself can determine the profitability of a single program or series based upon sales, ratings, and sellout assumptions for the operations. This deliverable includes reasonable estimates on projected return on investments under different purchase scenarios, and needs analysis based upon already owned content and facilities to provide accurate tracking of the negotiations process. | Content |
| Production 01 - Content Editing | Working with non-linear, random access editing systems, this deliverable can allow all production editing metadata to be captured and stored within the content library. | Content |
| Production 02 - UI | Production 02 can create user Interfaces for different types of production such as long form movies, series and live programming (sports, news, award shows) that can tie | Content |

TABLE I-continued

| Module/Stage | Description | Location |
| --- | --- | --- |
| | together content metadata and resource scheduling data to produce production project tracking and costing information and alerts. | |
| Production 03 | Placeholder for Production 01, since a single deliverable is probably insufficient to achieve objectives. | Content |
| Production Workflow 01 | This deliverable can provide the interface from content to the workflow engine. It describes all of the required production touchpoints as well as the interface to the engine from production with respect to other modules and subsystems of system. | Content |
| Production Workflow 02 | Placeholder for Production Workflow 01, since a single deliverable may be insufficient to achieve objectives. | Content |
| Workflow | This deliverable can provide the interface from delivery to the workflow engine, It describes all of the required delivery touchpoints as well as the interface to the engine from delivery with respect to other modules and subsystems of system. | Delivery |
| Delivery 01 - Playlist editing | This deliverable can provide the common method of editing for all schedules and playlists. It can provide tools for things such as timing, error checking, schedule rule override capability, and locking to support final editing of the presentation EDL(playlist/log). It can Include a UI that allows merging of various schedules such as multichannel broadcast or broadcast schedule with magazine and billboard publications or broadcast schedule with movie releases. It can allow the creation of alerts to notify. | Delivery |
| Delivery 02 - Machine Control | The Presentation EDL can allow real time changes to a digitally based broadcast schedule. This deliverable can use the Presentation EDL to control video server/digital device playouts. This deliverable can also provide integration with the DAL automation systems for analog playout control. | Delivery |
| Delivery 03 - Digital Management/Network routing | Digital stream management including bandwidth management, network distribution routing, switching and satellite distribution both record and playout can be delivered. | Delivery |
| Delivery 04 | Placeholder for Delivery 01–03, since a single deliverable may be insufficient to achieve objectives. | Delivery |
| Contact 01 | This deliverable can enhance the basic organizational unit and users created for security to add contextual usage data that can allow creation of business entities such as agencies, producers, distributors, and advertisers etc and the people who work for those businesses. These entities establish the Contact system. This is the start of a rudimentary CRM system which supports integration of scheduled contact management. | Finance & Admin |
| Contact 02 | This deliverable incorporates relationship mapping into the basic CRM. Business types and users may be linked to establish common business relationships. Relationships may be defined between two contact types including a contextual focus, i.e., advertiser/agency, producer/distributor, agency/sales executive, agency/station, etc. These contextual relationships can establish a media/content-centric CRM function that can be used by all areas of the system. | Finance & Admin |
| Base regulatory reporting/licensing | Regulatory Reporting ensures storage of the appropriate attributes and data-structures to satisfy a generic approach to regulatory reporting. In addition, basic children's and political reporting for US domestic regulations can be supported. ARM can be tailored to meet the unique government regulatory reporting requirements. Specific country regulatory reporting can be handled as the system is rolled out to those countries. | Finance & Admin |
| Royally Management | Royalty Management extends rights management with ties to regulatory reporting/requirements (e.g., ASCAP/BMI etc.). It takes the basic rights/financial relationships and creates a financial trail of "dollars" back to the original contract and/or content owner as a tangible manifestation of the value of "Rights Genetics ™". These transactions used to calculate royalties which can then be posted to an accounts payable module. | Finances & Admin |
| Billing | This deliverable can allow for the capturing of information necessary to generate an invoice for a client. Such information includes payee name, summary of all the events and billable items (some may be pure invoice line items). The system can have the ability to check for all invoice details across the time line of the database. | Finance & Admin |
| Accounts Receivable 01 | This is the process of managing receipt of payments and invoices. The system can develop a series of APIs for third party financial systems to manage AR within their systems. The system can handle the reconciliation process and provide rolled up. | Finance & Admin |
| Accounts Receivable 02 | This deliverable can provide credit management by tracking bookings and AR status and comparing them to credit information. Various communication methods can be available to manage issues. Should a client require a specific AR module as part of the system, then this module can allow for further development as part of this lego set. | Finance & Admin |
| Commissions | A new Commissions module can support the extraction of data from the sales and accounts receivables systems to allow calculation of salesperson commissions. The preferred route of managing this is through an API to an HR system. Rules for calculating the commission can be held within the system and can include the percentage of revenue generated in a month versus sales target. Any invoice query and subsequent credit can also need to be taken into account as part of a commission calculation. | Finance & Admin |
| Budgeting 01 - Program & Contracts | Content Budgeting can focus on the budgeting required by program schedulers and content acquisition/commissioning staff. This Involves setting budgets by media, channel, genre, season period or day and plotting spend against these budgets. Content purchase budgets may also be monitored against actual sales revenue. These functions allow for program purchase planning and ROI assessments. | Finances & Admin |
| Budgeting 02 - Sales Budgets | Revenue (Sales) budgets to track advertising sales may be set for sales person manager, group, program, delivery stream, advertiser etc and can be capable of a top | Finances & Admin |

TABLE I-continued

| Module/Stage | Description | Location |
|---|---|---|
| Budgeting 03 - Resources | down or bottom up approach. Predicted revenue may be entered Into a specific timeframe along with other non-revenue based information (CPT, minutage, ratings etc., allowing for an assessment of inventory pricing as well as simple booked versus. Resource and production budgeting can allow producers to create and track expenses for resources at a project level. An example would be for producers producing in-house promotions to allocate a budget to the promotion group for production or an edit suite, but be able to apply this at specific project level. Costs for promotions/other productions should be held and compared against budget. Use of the promotion based upon schedule would either allow for an amortization rule to be used or on a fixed value basis and ROI generated for the specific project. Actual production costs could then be compared against budget. | Finances & Admin |
| Distribution 02- Billing | Financial requirements including tracking and invoicing of content payments and distribution rights payments can be delivered. These invoice requirements can use the basic invoicing engine with enhancements and integration of other non-time invoicing. | Finances & Admin |
| Workflow | This deliverable provides the interface from research to the workflow engine, It describes all of the required research touchpoints as well as the interface to the engine from research with respect to other modules and subsystems of the system. | Research |
| Base Research 01 | There are 8 scheduled Research deliverables. The final research tool can include quantitative and qualitative research data including international requirements for both commercial and non-commercial content. It can use components from existing systems where applicable, which have been re-worked to fit Into the System framework. It allows for respondent and aggregate level data and can provide basic analysis similar in scope to current Encoda tools and competitors (TvScan, One Domain, InVision, etc.). The final research tool can also allow for the holding and usage of a variety of research data, for example: ratings would be applicable to a broadcast event, impressions or "hits" would be applicable to a web site based event. Data of common type, such as ratings, can be held using different standards. Impacts, based upon an agreed denominator, should be capable of addition and then recalculation against a new universe. This may be appropriate for bookings across multiple regions with various data suppliers. There should be a comprehensive set of algorithms to aid use of this data for prediction purposes. | Research |
| Base Research 02 | Provide missing or inadequate functionality in the re-worked system, focusing on base analysis comparable to competitive systems such as TVScan, One Domain, InVislon, etc. Reporting capabilities are included. | Research |
| Base Research 03 | Identify quantitative research data needed for additional mediums: internet, print, outdoor, etc., including international requirements for both commercial and non-commercial content. Identify which components of the existing system can be used, if any. Re-work existing system(s) to fit into the system framework and technology, if any. | Research |
| Base Research 04 | Provide missing or inadequate functionality in the re-worked system, focusing on base analysis comparable to competitive systems. | Research |
| Advanced Research 01 | Provide the ability to hold and analyze data from "new" feedback loops, including Tivos and single source respondent data from Apollo (VNU/Arbitron project), etc. | Research |
| Advanced Research 02 | Provide the ability to "merge" appropriate data across mediums, regions, etc. through creating a "common denominator" that can be used to analyze and compare disparate data. | Research |
| Advanced Research 03 | Incorporate qualitative data into the system, including stand-alone data and the ability to "weight" quantitative data. | Research |
| Advanced Research 04 | Provide robust optimization analysis including advanced modeling and pattern recognition resulting in suggested rule modifications. | Research |
| Workflow | This deliverable can provide the interface from sales to the workflow engine. It describes all of the required sales touchpoints as well as the interface to the engine from sales with respect to other modules and subsystems of the system. | Sales |
| Sales 01 | The sales modules allows for the trading between an agency/advertiser and media seller. This release focuses on the touch points necessary to create and manage the contract or deal. It can use previously released components that support CRM for user and buyer details. The deals and campaign infrastructure can be set up to cover any media and any delivery mechanism. | Sales |
| Sales 02 | This deliverable can include the inventory infrastructure needed to manage inventory, including breaks, pages, sell patterns, etc. along with items like reporting category and clash code. Pricing control tools can also be delivered. Integration with previously released content deliverables to support the management of commercial content can be provided. | Sales |
| Sales 03 | Sales Proposals can support multi-media campaigns or activities that can be "proposed" to the buyer. Optimization from research can also be utilized at this level. This module can focus on the booking and optimization of revenue for multiple specific market requirements such as CPT/CPP, spot booking, program sponsorships, targeted advertising, and other new developing sales models. | Sales |
| Sales 04 | Sales workflow to track media negotiations and contract approvals across trading partners can be included in this deliverable. Sales 04 can focus on B2B as well as post analysis and utilization of research to present the best value to the buyer. | Sales |
| Workflow | This deliverable can provide the interface from scheduling to the workflow engine. It describes all of the required scheduling touchpoints as well as the interface to the engine from scheduling with respect to other modules and subsystems of The system. Note that scheduling encompasses both the user aspects of scheduling as well as any background system processes. | Scheduling |

TABLE I-continued

| Module/Stage | Description | Location |
|---|---|---|
| Scheduling LF/SF Content 01 | This deliverable can include a context focused approach to scheduling all non-commercial content. It should make use of the EDL work done in Library Management, respect placement rules, rights and restrictions, and should provide both long-range and short-range scheduling views. The approach can be real-time and incorporate the scheduling UI metaphor so that it can be repurposed In delivery, but is immediately useful to create saleable inventory as it can handle the creation and management of programming. | Scheduling |
| Scheduling LF/SF Content 02 | This deliverable can extend Into drag and drop multi-stream (multi-media) concurrent scheduling, e.g., main content stream of video/audio with parallel streams of, for example, an audio channel that is a simulcast onto another medium where the user could create "landing zones" for different content, commercial or otherwise. | Scheduling |
| Scheduling sales content 01 | This deliverable can handle the traditional realm of the current placers/plotters in existing systems. It can take the development of EDIs in library management, and extend their usage to the placement of orderable/commercial content. It can have the ability to handle traditional "spots" and related content bookings (bookends, associated sponsorships, etc.). The principles of placement can be extended to other mediums. Other known non-traditional commercial placement can be considered, specifically, those that have a tracking/reconciliation mechanism in place. For those that do not, a manual entry mechanism in delivery can be provided. | Scheduling |
| Scheduling sales content 02 | This deliverable extends the scheduling of sales content functionality into other mediums and starts and includes the ability to respect client rules and basic learning associated with those rules. | Scheduling |
| Scheduling resources 01 | In addition to scheduling content, the scheduling engine can be capable of matching resources with demand in general - based upon rules and constraints. This module focuses on the scheduling of resources such as studios, cameras, routers, switchers, staff, etc., in a way that allows an organization to leverage that scheduling and match it up with the delivery streams. | Scheduling |
| Scheduling resources 02 | Placeholder for Scheduling resources 01, since a single deliverable may be insufficient to achieve all objectives. | Scheduling |

As shown in FIGS. 1-5, embodiments of the present invention can include methods of managing media content. For example, as perhaps best shown in FIG. 3, a method 90 of managing media can include interfacing a preselected network framework with an established network framework so that the preselected network framework defines a network stage (block 91), generating program code responsive to the network stage (block 92), establishing a content management framework responsive to the program code so that the content management framework defines a content search engine (block 93), and providing a media content services core responsive to the content search engine to enhance digital file management and allow a plurality of media content management services to be performed (block 94).

It is important to note that while embodiments of the present invention have been described in the context of a fully functional system those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and instructions related to the content management program product 30 and much of the method steps described above.

Specifically, embodiments of the present invention can include program products, e.g., program product 30, and computer readable media readable by a computer. An embodiment of a program product 30 can be stored in a tangible computer medium (or media). According to this embodiment, the program product 30 is adapted to operate to perform various steps including, for example, interfacing a preselected network framework with an established network framework, establishing a content management framework so that the content management framework defines a content search engine, and performing one or more media content services responsive to the content search engine to enhance digital file management.

According to embodiments of the present invention, the program product 30 can stored in a computer readable medium. Accordingly, embodiments of the present invention can include a computer readable medium that is readable by a computer to manage media content. For example, according to an embodiment of the present invention, a computer readable medium can include a set of instructions that when executed by a computer cause the computer to perform operations of providing an industry generic framework to thereby provide a content management program product adapted to define metadata related to media content and to manage content relationships, providing a code generator adapted to generate program code for the industry generic framework, and providing a plurality of media industry specific core reusable modules adapted to provide a plurality of media industry specific functions.

The instructions can also include those to perform the operations of providing a framework stage adapted to hold content management framework under development for inclusion in the industry generic framework, providing a plurality of user selectable media modules selectable by a user to customize the content management program product, and contextually applying metadata from one or more pieces of media content and relating the content to a plurality of processes including scheduling and library management.

The operations can include providing a library management module adapted to manage physical and digital media including content form control, providing a contacts module adapted to build and maintain a plurality of business hierarchies, providing a security module adapted to define roles, assign users to roles and to grant access to resources, data, and actions responsive to the assigned user roles, providing a system configuration module adapted to define system, user, and user value lists, and to customize settings, and providing a search engine adapted to locate each of a plurality of domain objects associated with the content management program product.

According to an embodiment of the present invention, the computer readable medium can include a set of instructions that when executed by a computer cause the computer to perform the operations of establishing a content management framework responsive to a network stage, generating program code responsive to the network stage, and accessing the program code to perform a plurality of content management services. According to this embodiment of the present invention, contact management framework can include a user interface (UI) program, a messaging program, an agent program, and a searching program. The instructions can also include those to perform the operations of providing a media content services core responsive to the content search engine to enhance digital file management and allow a plurality of media content management services to be performed, and providing a set of media content service modules each in communication with the media content services core to perform content management services to media. The operations can also or alternatively include deploying the set of media content service modules with client software, and managing remote connectivity to application servers utilizing the preselected network framework and the generated code. The media content service modules can represent a client-side façade that hides complexity of the media content services core. Accordingly, the instructions can include those to perform the operations of providing parameters to the media content services core to execute methods associated with media content services core modules, and returning domain objects, domain object collections, or exceptions responsive to the provided parameters.

This application is related to U.S. Provisional Patent Application No. 60/711,699, by Bugir et al. titled "System, Program Product, and Methods to Enhance Media Content Management," filed on Aug. 26, 2005; U.S. Non-Provisional patent application Ser. No. 11/305,870, by Bugir et al., titled "System, Program Product, and Methods to Enhance Media Content Management," filed on Dec. 16, 2005; U.S. Provisional Patent Application No. 60/711,700, by Bugir et al., titled "System, Methods, and Program Product to Trace Content Genealogy," filed on Aug. 26, 2005; U.S. Non-Provisional patent application 5cr. No. 11/305,873, by Bugir et al., titled "System, Methods, and Program Product to Trace Content Genealogy," filed on Dec. 16, 2005; U.S. Provisional Patent Application No. 60/715,664, by Bugir et al., titled "System, Program Product, and Methods to Enhance Media Content Management," filed on Sep. 8, 2005; U.S. Non-Provisional patent application Ser. No. 11/305,852, by Bugir et al., titled "System, Program Product, and Methods to Enhance Media Content Management," filed on Dec. 16, 2005; U.S. Provisional Patent Application No. 60/712,051, by Bugir et al., titled "System, Methods, and Program Product to Trace Content Genealogy," filed on Aug. 29, 2005; and U.S. Non-Provisional patent application Ser. No. 11/305,871, by Bugir et al., titled "System, Methods, and Program Product to Trace Content Genealogy," filed on Dec. 16, 2005.

In the drawings and specification, there have been disclosed embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

The invention claimed is:

1. A content management system comprising:
   a preselected network framework defining a network stage and adapted to interface with an established network framework, said preselected network framework including a first preselected network framework defining a first network stage and a second preselected network framework responsive to the first network stage and defining a second network stage;
   a code generator responsive to the network stage to generate program code;
   a framework stage executed in a computer readable storage medium and responsive to the code generator to establish a content management framework and define a content search engine adapted to locate each of a plurality of domain objects associated with a content management program product, said framework stage including a user interface (UI) program, a messaging program, an agent program, and a searching program;
   a media content services core responsive to the content search engine to enhance digital file management and allow a plurality of media content management services to be performed; and
   a set of media content service modules, including a physical content module having content metadata capture and physical content library management, each responsive to the media content services core to perform content management services to media, the set being selected from the plurality of media content management services,
   wherein usage of the modules is abstracted from the underlying technology of the established network framework.

2. A system as defined in claim 1, wherein the media content services core includes an application coordinator, a windows user interface, a user interface controller, a user interface configurator, a domain establisher, a core services common provider, a core services content provider, and a core services scheduler.

3. A system as defined in claim 1 further comprising a set of media content service modules each responsive to the media content services core to perform content management services to media, the set being selected from the plurality of media content management services.

4. A method comprising:
   interfacing a preselected network framework with an established network framework so that the preselected network framework defines a network stage; generating program code responsive to the network stage;
   establishing a content management framework responsive to the program code so that the content management framework defines a content search engine adapted to locate each of a plurality of domain objects associated with the content management program product;
   providing a media content services core responsive to the content search engine to enhance digital file management and allow a plurality of media content management services to be performed;

providing a set of media content service modules each in communication with the media content services core to perform content management services to media, the set being tailored to individual user requirements;

contextually applying metadata from one or more pieces of content and relating the content to a plurality of processes including scheduling and library management;

providing parameters to the media content services core to execute methods associated with the set of media content services core modules: and returning domain objects, domain object collections, or exceptions responsive to the provided parameters, wherein the media content service modules represent a client-side facade that hides complexity of the media content services core.

5. A method as defined in claim 4 wherein the step of providing a set of media content service modules further comprises the steps of:

deploying the set of media content service modules with client software; and managing remote connectivity to application servers utilizing the preselected network framework and the generated code.

6. A method of managing media content through an enterprise level content management platform, the method comprising the steps of:

providing an industry generic framework to thereby provide a content management program product adapted to define metadata related to media content and to manage content relationships;

providing a framework stage to hold content management framework under development for inclusion in the industry generic framework;

providing a code generator adapted to generate program code for the industry generic framework;

providing a search engine adapted to locate each of a plurality of domain objects associated with the content management program product;

contextually applying metadata from one or more pieces of content and relating the content to a plurality of processes including scheduling and library management;

providing a plurality of media industry specific core reusable modules adapted to provide a plurality of media industry specific functions; and providing a plurality of user selectable media modules selectable by a user to customize the content management program product, wherein the user selectable media modules represent a client-side facade that hides complexity of the industry generic framework.

7. A method as defined in claim 6, further comprising the steps of:

providing a library management module adapted to manage physical and digital media including content form control;

providing a contacts module adapted to build and maintain a plurality of business hierarchies;

providing a security module adapted to define roles, assign users to roles, and to grant access to resources, data, and actions responsive to the assigned user roles; and providing a system configuration module adapted to define system, user, and user value lists, and to customize settings.

8. A method as defined in claim 6, wherein the step of providing a plurality of media industry specific core reusable modules includes providing at least three of the following:

an application coordinator adapted to interface with at least one of the plurality of user selectable media modules to thereby provide security management;

a Windows user interface adapted to interface with Windows systems;

a user interface controls module adapted to control user interface selection;

a user interface configurator module adapted to configure user interface settings;

a scheduling module adapted to interface with a plurality of user selectable scheduling modules;

a content module adapted to interface with a plurality of user selectable content modules;

a common module adapted to interface with a plurality of common user selectable modules;

a finance and administration module adapted to interface with a plurality of user selectable finance or administration modules;

a research module adapted to interface with a plurality of user selectable research modules; and a sales module adapted to interface with a plurality of user selectable sales modules.

9. A system as defined in claim 3, wherein the set of media content service modules comprises an auditing module, a system configuration module, a contacts module, a security module, a logical content module, and a scheduling module.

10. A system as defined in claim 1 wherein the code generator is responsive to the second network stage to generate the program code.

* * * * *